(12) United States Patent
Fowler

(10) Patent No.: US 9,315,732 B1
(45) Date of Patent: Apr. 19, 2016

(54) ASH FILTER AND REBOILER

(71) Applicant: Infinitus Renewable Energy, LLC, Plantation, FL (US)

(72) Inventor: David W. Fowler, Orange Beach, AL (US)

(73) Assignee: Infinitus Renewable Energy, LLC, Plantation, FL (US)

( * ) Notice: Subject to any disclaimer, the term of this patent is extended or adjusted under 35 U.S.C. 154(b) by 0 days.

(21) Appl. No.: 14/569,083

(22) Filed: Dec. 12, 2014

(51) Int. Cl.
| | |
|---|---|
| *B01D 47/02* | (2006.01) |
| *C10B 53/07* | (2006.01) |
| *B01D 1/06* | (2006.01) |
| *C10B 27/00* | (2006.01) |
| *B01D 5/00* | (2006.01) |
| *B01D 53/00* | (2006.01) |
| *C10G 1/10* | (2006.01) |

(52) U.S. Cl.
CPC . *C10B 53/07* (2013.01); *B01D 1/06* (2013.01); *B01D 5/003* (2013.01); *B01D 5/0012* (2013.01); *B01D 47/02* (2013.01); *B01D 53/002* (2013.01); *C10B 27/00* (2013.01); *C10G 1/10* (2013.01)

(58) Field of Classification Search
None
See application file for complete search history.

(56) References Cited

U.S. PATENT DOCUMENTS

| | | | | |
|---|---|---|---|---|
| 1,418,885 | A * | 6/1922 | Schulze | 203/21 |
| 2,939,770 | A * | 6/1960 | Schwartzkopff | B01J 19/20 159/25.2 |
| 4,126,431 | A * | 11/1978 | Wolowski et al. | 95/42 |
| 4,284,616 | A * | 8/1981 | Solbakken et al. | 423/449.7 |
| 4,307,773 | A | 12/1981 | Smith | |
| 4,762,686 | A * | 8/1988 | Lehto | 422/168 |
| 5,057,189 | A * | 10/1991 | Apffel | 202/113 |
| 5,871,618 | A | 2/1999 | Lee et al. | |
| 6,322,763 | B1 * | 11/2001 | McDaniel | 423/242.1 |
| 6,402,816 | B1 * | 6/2002 | Trivett et al. | 95/226 |
| 6,413,378 | B1 | 7/2002 | Kanauchi et al. | |
| 7,310,972 | B2 | 12/2007 | Yoshida et al. | |
| 7,847,136 | B2 * | 12/2010 | Nill | C10G 1/10 196/98 |
| 2004/0053039 | A1 * | 3/2004 | Ekstrom et al. | 428/325 |
| 2011/0265647 | A1 | 11/2011 | Find et al. | |

FOREIGN PATENT DOCUMENTS

WO   2014064648 A2   5/2014

* cited by examiner

*Primary Examiner* — Renee E Robinson
*Assistant Examiner* — Jonathan Miller
(74) *Attorney, Agent, or Firm* — Jetter & Associates, P.A.

(57) ABSTRACT

An ash filter and reboiler (ash filter/reboiler) includes an inlet tube heat exchanger including an outer column (column) having a vapor inlet tube through an inlet of the column coupled therein to receive fuel vapors including entrained ash particles and to direct the fuel vapors including the entrained ash particles out from a bottom of the vapor inlet tube toward a bottom portion of the column. A cooler over the bottom portion of the column for condensing the fuel vapors including the entrained ash particles to liquid fuel. A pump coupled to an outlet in a bottom of the column is for pumping out an ash particle laden portion of the liquid fuel. A heater is above the cooler for vaporizing the liquid fuel into reboiled vapor, and a vapor outlet is at a top of the column for releasing the reboiled vapors out from the column.

16 Claims, 3 Drawing Sheets

US 9,315,732 B1

ASH FILTER AND REBOILER

FIELD

Disclosed embodiments relate to ash filter and reboilers, such as used as separate steps in tire conversion systems.

BACKGROUND

Systems and methods are known for tire recycling where discarded tires that are cut into pieces (tire crum) that are processed in a reactor chamber configured for pyrolysis processing under a slight vacuum in an essentially oxygen-free atmosphere to generate carbon char, steel, and hydrocarbon oils and gases. Some of the gases referred to as pyrolytic gases or syn-gas have 4 or less carbons (≤C4) are generated when a carbon-based bio-mass is thermo-cracked have boiling points too low to condense into a liquid using conventional condensation processing.

FIG. 1 is a simplified depiction of a conventional pyrolytic tire conversion system (tire conversion system) 100 including a feed mechanism 110 for feeding the tire material (tire crum) into an inlet 120a of a reactor chamber 120 essentially without letting air (oxygen) in the inlet. A mechanism for conveying the material through the reactor chamber 120 is provided to vaporize the tire material into vapors and for conveying solid material including carbon char and steel. The reactor chamber 120 includes a flue pipe 120c for releasing vapors generated and another output 120b for releasing the pyrolized solid material generated. The vapors exiting the flue pipe 120c include hydrocarbons having entrained ash particles.

The vapors having entrained ash particles after exiting the flue pipe 120c are cooled by a heat exchanger/condenser 130 shown as a fuel condenser to liquefy a portion of it to provide liquid fuel that is collected in a collection tank 140, with the non-condensable portion being a gas mixture generally being C4 or below which is directed to a flaring apparatus 150 for flaring these gases. The liquid fuel is generally pumped away from the collection tank 140, where the fuel may then be filtered in an additional step to remove the ash particles. The solid material generated including carbon char and steel is generally discharged from the output 120b of the reactor chamber 120 via a screw conveyor (e.g., outlet auger) 125 (which may also provide char removal) that is typically air locked from the vacuum in the reactor chamber 120 by valves or gates, and the solid material is transferred through a housing to a closed bin (recovery hopper) 145.

SUMMARY

This Summary is provided to introduce a brief selection of disclosed concepts in a simplified form that are further described below in the Detailed Description including the drawings provided. This Summary is not intended to limit the claimed subject matter's scope.

An ash filter and reboiler (ash filter/reboiler) includes an inlet tube heat exchanger including an outer column (column) having a vapor inlet tube through an inlet of the column coupled therein to receive fuel vapors including entrained ash particles and to direct the fuel vapors including the entrained ash particles out from a bottom of the vapor inlet tube toward a bottom portion of the column. A cooler over the bottom portion of the column is for condensing the fuel vapors including the entrained ash particles to liquid fuel. A pump coupled to an outlet in a bottom of the column is for pumping out an ash particle laden portion of the liquid fuel. A heater is above the cooler for vaporizing the liquid fuel into reboiled vapor, and a vapor outlet is at a top of the column for releasing the reboiled vapors out from the column.

The ash filter/reboiler can be positioned between a flue pipe and fuel condenser of a tire recycling system including a reactor chamber. In this arrangement, the ash filter/reboiler is positioned between the flue pipe and fuel condenser to receive vapors including entrained ash particles and provide ash filtered reboiled vapors to the fuel condenser.

BRIEF DESCRIPTION OF THE DRAWINGS

Reference will now be made to the accompanying drawings, which are not necessarily drawn to scale, wherein.

DETAILED DESCRIPTION

Figure 1:
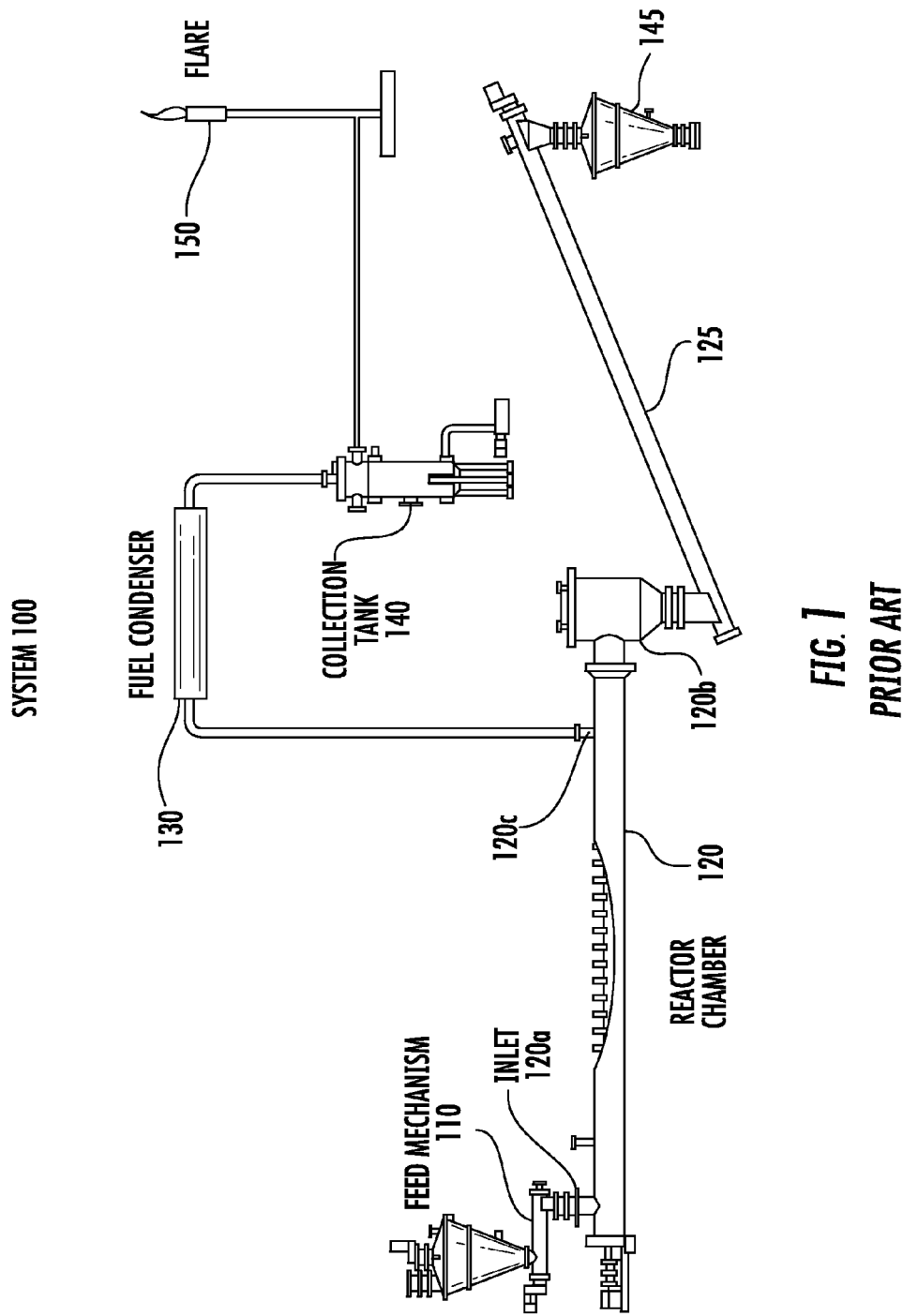
FIG. 1 is a simplified depiction of a conventional pyrolytic tire conversion system.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed ash filter/re-boilers are generally described herein as being positioned between the flue pipe of a reactor chamber and the inlet to a fuel condenser in a tire recycling system, such as between the flue pipe 120c and heat exchanger 130 of tire conversion system 100 shown in FIG. 1. However, disclosed ash filter/re-boilers can be used for a variety of systems besides tire recycling systems, generally in processing systems having a heat/vapor reactor, distiller, or any bio-mass pyrolysis system.

For a typical tire recycling system, such as the tire conversion system 100 shown in FIG. 1, ash filtering and re-boiling are two separate process steps. First, fuel in vapor form generated along with the entrained ash is collected from the flue pipe 120c of the reactor chamber 120 via a heat exchanger 130, which is then transferred to a collection tank 140 for ash filtering. Ash filtering may be through a centrifuge or a distillation process. Accordingly, for a typical tire recycling system separate collection tanks are provided for the fuel having a significant concentration of ash particles (dirty fuel) and for the fuel having a reduced concentration of ash particles (cleaned fuel). Also a transfer system for both dirty and clean fuels are generally utilized. In the case of a centrifuge cleaning of ash particles from fuel, water is generally used to backwash the centrifuge cleaning unit. A distillation system generally requires tanks and transfer systems too, along with added energy to evaporate and collect.

Disclosed ash-filter/reboilers recognize there is an advantage in utilizing the heat of the incoming fuel vapors and using the collected fuel (bubbler) to filter to clean the ash particles from the fuel. Disclosed ash-filter/reboilers also provide a way to allow heat from the incoming fuel vapors to keep the re-boiled vapors hot (and thus moving).

Carbon ash is a byproduct of vaporized tire crumb. This ash (or char) is light (low density) and a significant portion will travel entrained in the vaporized fuel out that flows out from the flue pipe 120c of the reactor chamber 120. This ash is partly carbon black and stains the fuel to a jet black color, where the true color of the pure fuel in contrast is light gold. This ash is considered a contaminant in some fuel specifications.

As a result, removal of the ash particles from the fuel increases the value of the fuel. The reactor chamber 120 discharges the fuel vapors including entrained ash particles out the flue pipe 120c at about the same temperature as the reactor chamber 120. It is recognized to cool the fuel vapors down to a liquid stat then reboil them back to a vapor temperature is generally a "waste" of energy. A design that uses the heat of the fuel vapors received from the reactor chamber 120 is recognized to be able to improve system efficiency, such as the efficiency of the tire conversion system 100. This embodiment uses radiant heat from the fuel vapors to expand the reboiled fuel vapors to help push the fuel material up a column and allow the ash particles to be saturated with liquid fuel, thus separating the ash particles from the liquid fuel.

Figure 2A:
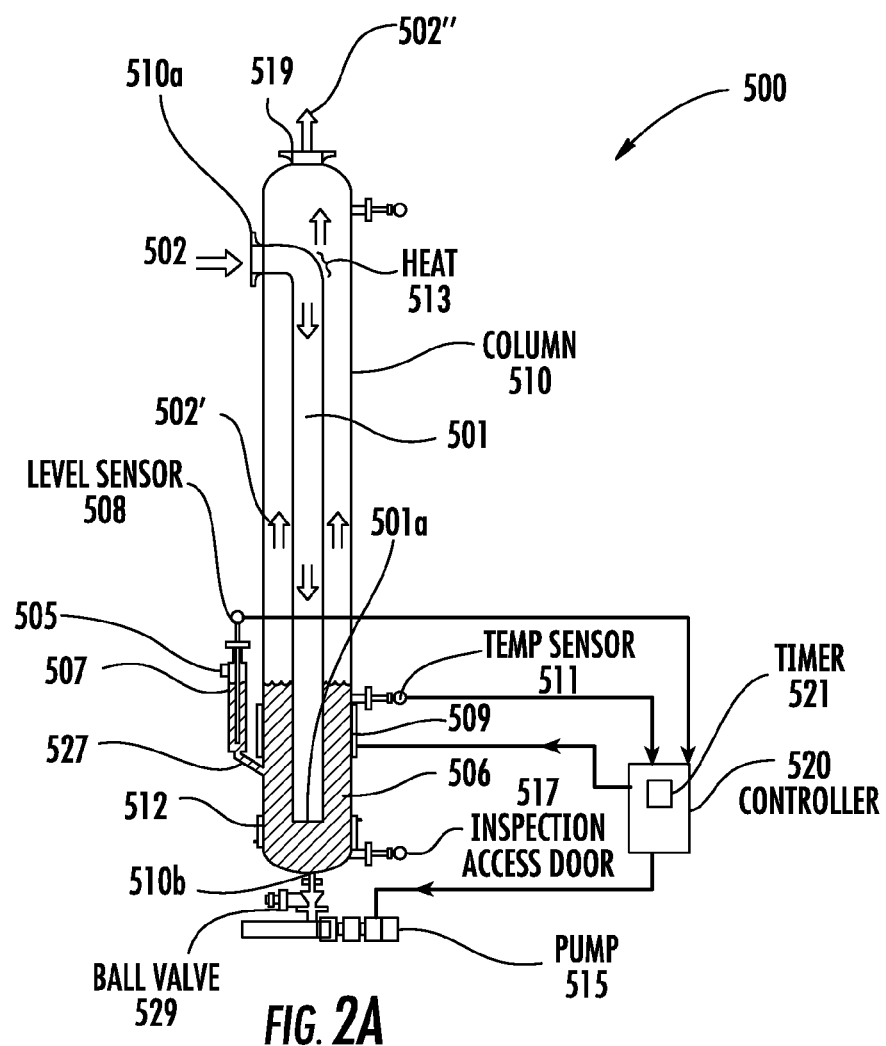
FIG. 2A is a depiction of an example ash filter/reboiler, according to an example embodiment.

FIG. 2A is a depiction of an example ash-filter/reboiler 500 including an outer column (column) 510 having a vapor inlet tube 501 therein. Ash laden fuel vapors are pulled from a source of ash laden fuel vapors 502, such as from the flue pipe 120c of the reactor chamber 120 shown in FIG. 1 into the vapor inlet tube 501 coupled to the inlet 510a of the column 510. Once received, the ash laden fuel vapors 502 travel down the vapor inlet tube 501 which during their travel transfer heat from the inside of vapor inlet tube 501 to provide radiant heat 513 from the outside of the vapor inlet tube 501. The vapor inlet tube 501 is generally formed from a thermally conductive material defined herein as having a bulk thermal conductivity of ≥100 W/m·K, such as comprising a metal or metal alloy, being thin wall 310 stainless steel in one particular embodiment. Vapor inlet tube 501 thus functions as an inlet tube heat exchanger.

The ash laden fuel vapors 502 then emerge from an opening 501a at the bottom of the vapor inlet tube 501 and upon emerging from the opening 501a come in contact with cooled liquid fuel 506 that is cooled by a cooler shown as a water jacket 512 at the bottom portion of the column 510 which condenses the ash laden fuel vapors 502 into the liquid fuel 506 shown which may partially be in the form of vapor bubbles. Other coolers can be used besides a water jacket. As described in detail below, after ash particle removal processing of the liquid fuel 506, the liquid fuel 506 is heated by an electric heater band (heater band) 509 to form cleaned fuel vapors 502' which is provided as cleaned fuel vapor 502" that flows out from the vapor outlet 519 at the top of the column 510.

Figure 2B:
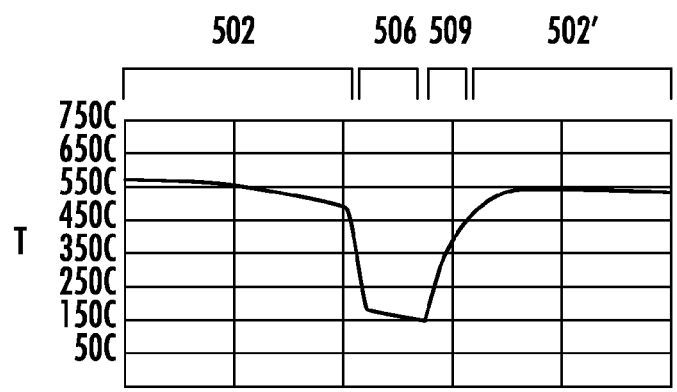
FIG. 2B shows an example temperature profile for an ash filter/reboiler as a function of position along the path from input to output for the ash laden fuel vapors, cooled liquid fuel, heater band and cleaned fuel vapor.

FIG. 2B shows an example temperature profile for an ash filter/reboiler as a function of position along the path from input to output of the ash-filter/reboiler 500 for the ash laden fuel vapors 502, cooled liquid fuel 506, heater band 509 and cleaned fuel vapor 502'. As shown, the cooled liquid fuel 506 is up to about 400° C. cooler as compared to the temperature of the ash laden fuel vapors 502 and cleaned fuel vapors 502'. As the ash laden fuel vapors 502 upon cooling turn into liquid fuel 506, the liquid fuel 506 soaks into the ash particles and as a result the ash particles become heavier (denser) as compared to the liquid fuel 506.

The heavier ash particles will thus drop towards the bottom of the liquid fuel 506 in the column 510 allowing pumping liquid fuel with concentrated ash particles out from the outlet 510b in a bottom of the column 510 by a pump such as the discharge pump 515 shown. For example, applied to the tire conversion system 100 shown in FIG. 1, the pumping can be back to the reactor chamber 120 through the same inlet 120a which receives the tire crumb from feed mechanism 110.

The pumping can be triggered by an elapsed time tracked by a timer 521 within the controller 520 that is shown coupled to an input of the discharge pump 515. Time-based control when implemented is generally used along with level control which utilizes level information of the liquid fuel 506 provided by level sensor 508 as described below. When the liquid level is increased beyond a predetermined high level, the discharge pump 515 will run to prevent over filling. The timer 521 is used if the predetermined high level to trigger operation of the discharge pump 515 is not reached after a predetermined period of time, so that ash collected in the fuel at the bottom of the column will still be removed via discharge pump 515.

Figure 3A:
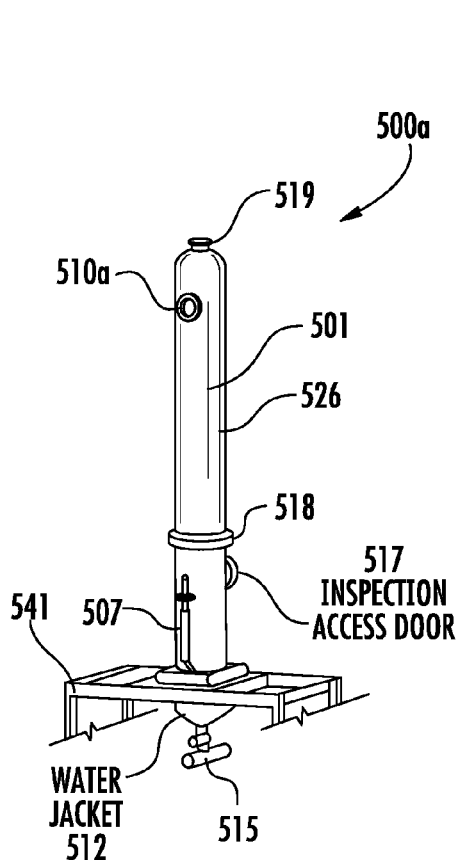
FIGS. 3A, B and C shows assembled, stack-up and cutaway views of an example ash filter/reboiler.

The column 510 can be designed to be attached to an expanding reactor, such as to the reactor chamber 120 of the tire conversion system 100 shown in FIG. 1, with its vapor inlet tube 501 coupled to receive fuel vapors with entrained ash particles from the flue pipe 120c of the reactor chamber 120. In this design, the ash-filter/reboiler 500 can be mounted on a rolling cart 541, such as depicted in FIG. 3A described below.

The discharge pump 515 is generally attached to a flex hose to allow for movement. A liquid fuel outlet is shown as a ball valve 529. The upper section of the column 510 is shown as 526 in FIGS. 3A-C, and vapor inlet tube 501 can be welded to a spinable flange shown in FIG. 3A via a stub end flange connection 518. This allows alignment of the location of the vapor inlet tube 501.

A side chamber 507 is shown attached on the side of the column 510 outside the heater band 509 that has a fluid connector portion 527 for providing liquid fuel 506 into the side chamber 507. The temperature of the liquid fuel 506 in the side chamber 507 is generally significantly cooler than the temperature of the liquid fuel 506 in the column 510, with the liquid fuel 506 in the side chamber 507 shown cooled by a gas cooling port 505 that is coupled to receive a gas flow for cooling such as $N_2$ from a $N_2$ source. The gas flow for cooling can lower the temperature of the liquid fuel in side chamber 507 relative to the liquid fuel 506 in the column 510. The temperature of the liquid fuel 506 in the side chamber 507 relative to the liquid fuel 506 in the column 510 is generally lower by 5% to 30% when expressed in ° C.

The level sensor 508 is shown on the top of the side chamber 507. The level sensor 508 is operable for proving an essentially continuous level measurement to the controller 520 that permits maintaining the liquid level inside the column 510 within a predetermined level range and maintaining a continuous liquid level without seeing high heat of the liquid fuel 506 that may be about 200° C. to 250° C. The level measurement can be used to trigger the controller 520 to send a control signal for turning ON of the discharge pump 515 to maintain a level for the liquid fuel 506 over the heater band 509 so the liquid fuel 506 boils and does not excessively heat on the side.

Ash-filter/reboiler 500 is also shown comprising at least one temperature sensor including temperature sensor 511. A set of thermo couplings (not shown) can be slipped between the heater band 509 and the column 510 to maintain control of the temperature of the liquid fuel 506. The thermo couplings function to tell the controller 520 such as a solid state relay (SSR) controller the temperature which is used to stop or start the heater band 509 as needed to reach the set point temperature. Two thermo couplings may be used with one used as a back-up. Such temperature control can avoid excessive temperatures which can reduce the amount of ash particle laden fuel being re-vaporized into the cleaned fuel vapor 502' that moves up the column 510 as shown in FIG. 2A.

In operation, the pumping cycle executed by ash-filter/reboiler 500 will remove most of the collected ash particles from the incoming ash laden fuel vapors 502 and as described above can return the liquid fuel with concentrated ash particles to the inlet 120a of the reactor chamber 120 of the tire conversion system 100 shown in FIG. 1 for drying. As the collected vapors turn into liquid and make a level point, heat is added via a heater band 509 sufficient to vaporize the fuel again to provide cleaned fuel vapors 502'. This cleaned fuel vapor 502' travels up the column 510 and continues to pick up heat from the vapor inlet tube 501 shown as radiant heat 513. This heat 513 helps to expand the vapors and increase the travel velocity up the vapor inlet tube 501. The cleaned fuel vapors 502' will then be discharged from the vapor outlet 519 at the top of the column 510 into a condenser such as shown in FIG. 1 as fuel condenser 130 and back into cleaned fuel that can be deposited in a separate clean fuel collection tank.

Figure 3B:
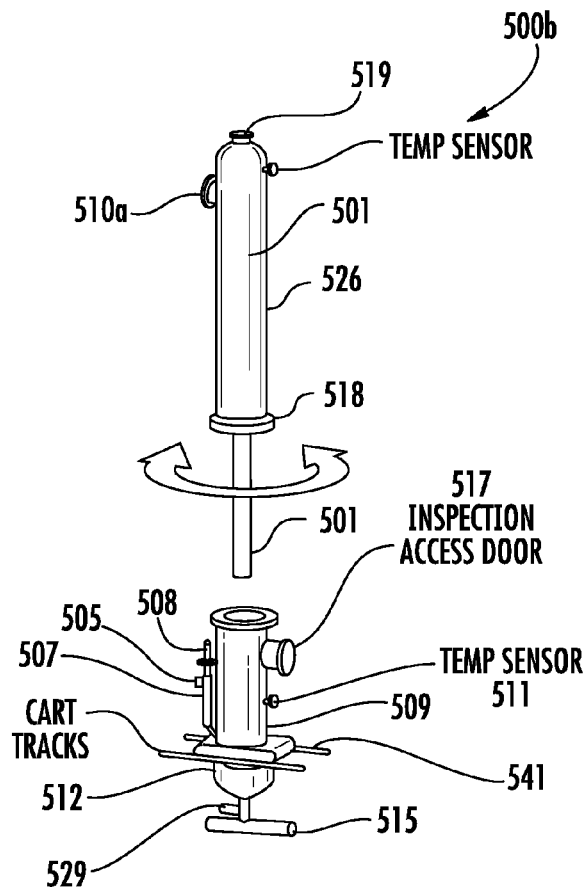
Figure 3C:
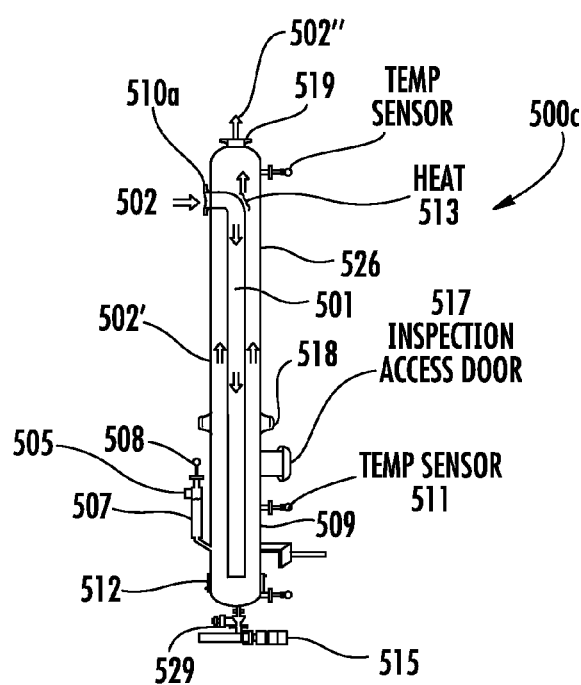

FIGS. 3A, 3B and 3C shows assembled, stack-up and cut-away depictions of the ash-filter/reboiler 500 shown in FIG. 2A and its attachments, as 500a, 500b and 500c, respectively. Ash-filter/reboiler 500 is shown in FIG. 3A mounted on a rolling cart 541. A stub end flange connection is shown as 518. Upper housing is shown as 526. The inspection access door is shown as 517.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The invention claimed is:

1. An ash filter and reboiler (ash filter/reboiler), comprising:
    an inlet tube heat exchanger including an outer column (column) and an inner vapor inlet tube (vapor inlet tube) having a tube length extending inside said column from an inlet of said column to a bottom opening at a bottom portion of said column, wherein said vapor inlet tube is coupled to receive fuel vapors including entrained ash particles and to direct said fuel vapors including said entrained ash particles out from said bottom opening to said bottom portion of said column;
    a cooler jacket over said bottom portion of said column for condensing said fuel vapors including said entrained ash particles to liquid fuel;
    a pump coupled to an outlet in a bottom of said column for pumping out an ash particle laden portion of said liquid fuel;
    a heater above said cooler jacket for vaporizing said liquid fuel into reboiled vapors, and
    a vapor outlet at a top of said column for releasing said reboiled vapors out from said column.

2. The ash filter/reboiler of claim 1, further comprising a controller, a timer and a liquid level sensor providing a sensed level of said liquid fuel to an input of said controller, wherein said controller is coupled to said pump and provides control signals to said pump to control a predetermined level set point for said liquid fuel in said column.

3. The ash filter/reboiler of claim 1, wherein said vapor inlet tube is formed from a thermally conductive material having a bulk thermal conductivity of ≥100 W/m·K.

4. The ash filter/reboiler of claim 2, further comprising a side chamber on a side of said column having a fluid connector providing said liquid fuel to said side chamber, wherein said liquid level sensor is positioned on said side chamber.

5. The ash filter/reboiler of claim 4, wherein said side chamber includes a gas cooling port which provides a gas flow for cooling said liquid fuel in said side chamber.

6. The ash filter/reboiler of claim 1, further comprising a system for pyrolyzing tires, said system comprising:
    a reactor including a pyrolysis (reactor) chamber including at least one heater having a pyrolysis zone, an inlet and outlets on respective sides of said pyrolysis zone, said outlets including a flue pipe and a second outlet;
    a feed system for transferring feedstock comprising tire pieces received from a feed source into said inlet;
    a conveyer for moving material associated with said tire pieces through said reactor chamber;
    wherein pyrolysis performed in said reactor chamber pyrolizes said feedstock to generate solid material and fuel vapors including said entrained ash particles;
    a fuel condenser coupled to said flue pipe for liquefying said fuel vapors before collection in a collection tank, and
    an outlet conveyor for transferring said solid material from said second outlet to a recovery hopper,
    wherein said ash filter/reboiler is positioned between said flue pipe and said fuel condenser to receive said fuel vapors including said entrained ash particles and provide said reboiled vapors to said fuel condenser.

7. The ash filter/reboiler of claim 6, wherein an output of said pump is coupled to pump said ash particle laden portion of said liquid fuel into said inlet of said reactor chamber.

8. The ash filter/reboiler of claim 1, wherein said tube length of said vapor inlet tube is equal to at least a majority of a length of said column.

9. A method of ash filtering and reboiling, comprising:
receiving fuel vapors including entrained ash particles at an inner vapor inlet tube of an inlet tube heat exchanger having a bottom opening that is inside[r] an outer column (column), wherein said vapor inlet tube comprises a thermally conductive material, wherein said vapor inlet tube has a tube length extending inside said column from an inlet of said column to a bottom opening at a bottom portion of said column and wherein said vapor inlet tube directs said fuel vapors including said entrained ash particles out from said bottom opening to said bottom portion of said column;
condensing said fuel vapors using a cooler jacket over a bottom portion of said column including into liquid fuel including said entrained ash particles;
pumping out an ash particle laden portion of said liquid fuel from said bottom opening of said column using a pump;
vaporizing said liquid fuel into reboiled vapor using a heater above said cooler jacket,
heating said reboiled vapor from radiant heat from said vapor inlet tube, and
releasing said reboiled vapor out from a vapor outlet at a top of said column.

10. The method of claim 9, further comprising sensing a level of said liquid fuel in said column and using a controller coupled to said pump which provides control signals to said pump to control a predetermined level set point for said liquid fuel in said column.

11. The method of claim 9, wherein said thermally conductive material has a bulk thermal conductivity of $\geq 100$ W/m·K.

12. The method of claim 10, wherein there is a side chamber on a side of said column having a fluid connector providing said liquid fuel to said side chamber, wherein a liquid level sensor on said side chamber provides said sensing of said level of said liquid fuel in said column.

13. The method of claim 12, further comprising using a gas cooling port on said side chamber to flow a gas for cooling said liquid fuel in said side chamber.

14. The method of claim 9, wherein an ash filter and reboiler (ash filter/reboiler) for performing said method is positioned between a flue pipe and a fuel condenser of a system for pyrolizing tires including a reactor chamber.

15. The method of claim 14, further comprising coupling an output of said pump into an inlet of said reactor chamber.

16. The method of claim 9, wherein said tube length of said vapor inlet tube is equal to at least a majority of a length of said column.

* * * * *